US005939695A

United States Patent [19]

Nelson

[11] Patent Number: 5,939,695

[45] Date of Patent: Aug. 17, 1999

[54] PRODUCT IDENTIFICATION SYSTEM USING HAND-HELD CUSTOMER ASSISTANT UNIT WITH A CODE READER

[75] Inventor: Donald Robert Nelson, Boulder, Colo.

[73] Assignee: Lucent Technologies, Inc., Holmdel, N.J.

[21] Appl. No.: 08/858,954

[22] Filed: May 20, 1997

[51] Int. Cl.[6] .......... G06K 15/00

[52] U.S. Cl. .......... 235/383; 235/385; 235/375; 235/472; 902/24

[58] Field of Search .......... 235/383, 385, 235/487, 375, 472, 462.45, 472.01; 902/24

[56] References Cited

U.S. PATENT DOCUMENTS

| | | | |
|---|---|---|---|
| 3,836,755 | 9/1974 | Ehrat | 235/383 |
| 4,071,740 | 1/1978 | Gogulski | 235/431 |
| 4,654,514 | 3/1987 | Watson et al. | 235/385 |
| 4,929,819 | 5/1990 | Collins, Jr. | 235/383 |
| 5,047,614 | 9/1991 | Bianco | 235/385 |
| 5,065,002 | 11/1991 | Tashiro et al. | 235/472 |
| 5,361,871 | 11/1994 | Gupta et al. | 235/383 X |
| 5,457,307 | 10/1995 | Dumont | 235/383 |
| 5,640,002 | 6/1997 | Ruppert et al. | 235/462 X |
| 5,773,954 | 6/1998 | VanHorn | 320/2 |

FOREIGN PATENT DOCUMENTS

| | | |
|---|---|---|
| 003940605 | 6/1991 | Germany . |
| 403249003 | 11/1991 | Japan . |

*Primary Examiner*—Michael G. Lee
*Attorney, Agent, or Firm*—Gregory A. Welte

[57] ABSTRACT

A device for providing product information to customers of a retail establishment. The device is a hand-held unit which contains a detector which identifies a product located nearby. The identification can be accomplished through scanning a bar code affixed to the product. Once the product is identified, the device retrieves descriptive information about the product from memory, and displays the information to the customer.

19 Claims, 9 Drawing Sheets

PRODUCT IDENTIFICATION SYSTEM USING HAND-HELD CUSTOMER ASSISTANT UNIT WITH A CODE READER

The invention concerns a hand-held device for assisting customers in obtaining product information in retail establishments.

BACKGROUND OF THE INVENTION

Many large retail merchandising establishments maintain a stock of tens of thousands of products. The number of products has become so vast, and the technical complexity of some of them so great, that it is impossible for personnel of the establishment to become familiar with all characteristics of all products. Customers are frequently required to contact the manufacturer of products, in order to gain information about the products.

The present invention proposes a system for providing product information to customers in a convenient, direct manner.

SUMMARY OF THE INVENTION

In one form of the invention, a hand-held scanner identifies a product in a retail establishment, and displays detailed information which describes the product.

DETAILED DESCRIPTION OF THE INVENTION

Hand-Held Device 3

Figure 1:
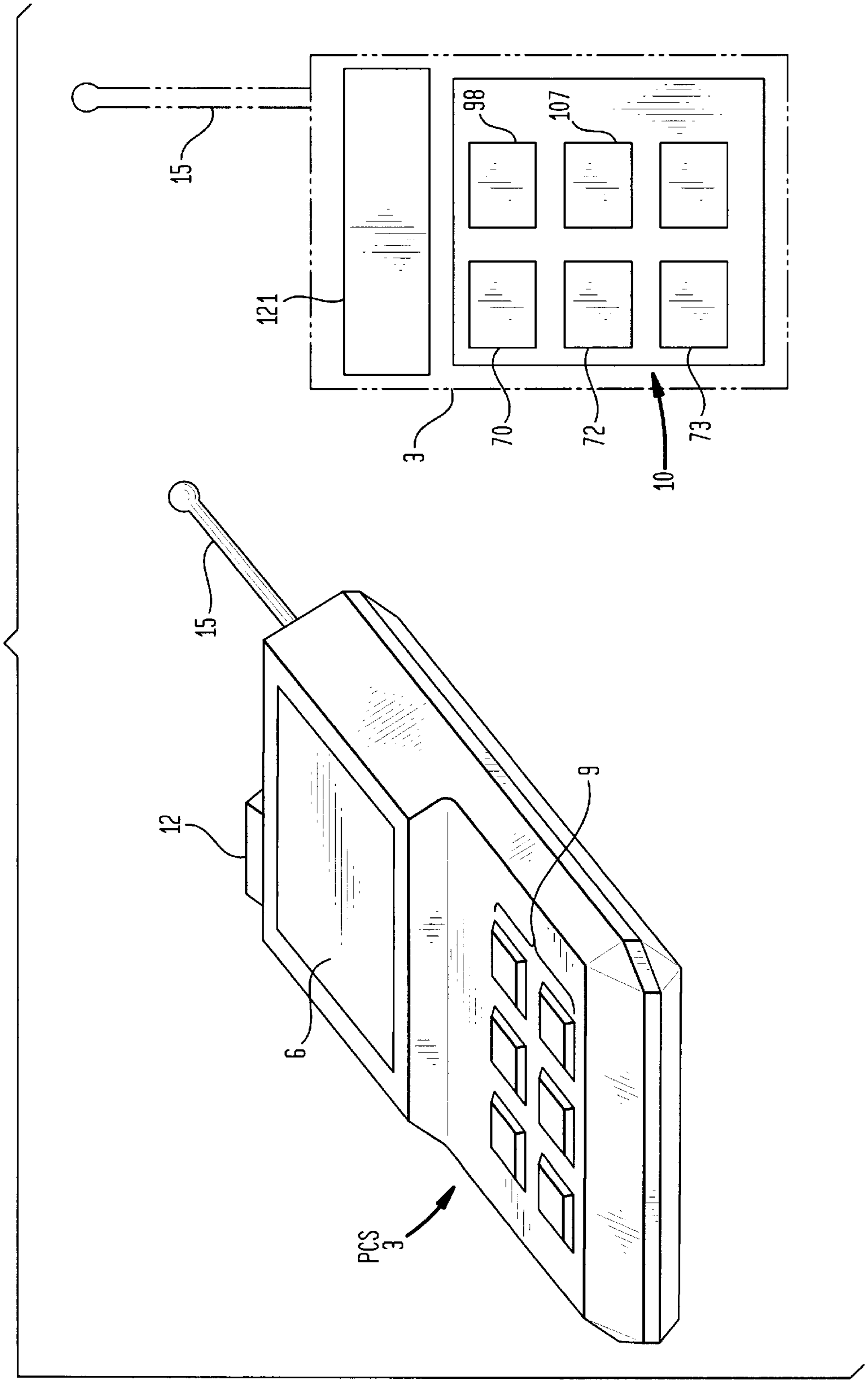
FIG. 1 illustrates one form of the invention, with a schematic of some internal components shown at the right side of the Figure.

FIG. 1 illustrates a battery-powered, hand-held device 3, termed a Personal Communication System, PCS, which contains a display 6, a small keypad 9, a bar-code reader 12 for reading Universal Product Codes (UPCs), and a communication antenna 15.

The PCS contains logic circuitry, indicated as 10 on the right side of the Figure. At least two approaches can be taken to implement this circuitry. In one approach, the logic circuitry is custom-designed. However, custom-designed circuitry is very expensive, and requires large production runs of the PCS, in order to be cost-effective.

If the PCS is to be produced in smaller quantities, then a second approach may be desirable, wherein a commercially available controller is used, instead of custom-designed circuitry. In this second approach, programming of the controller is required, plus a few interfacing steps, rather than the more complex task of designing an entire logic circuit.

One suitable controller is that based on the so-called "personal computer" architecture, which was developed by IBM Corporation, Armonk, N.Y., and utilizes the 8XX86 family of microprocessors, designed by INTEL Corporation, Santa Clara, Calif. This type of controller is available, for example, in the form of a single-board computer, from Octagon Systems, 6510 West 91st Avenue, Westminister, Colo.

Logic Undertaken by Device 3

Figure 1A:
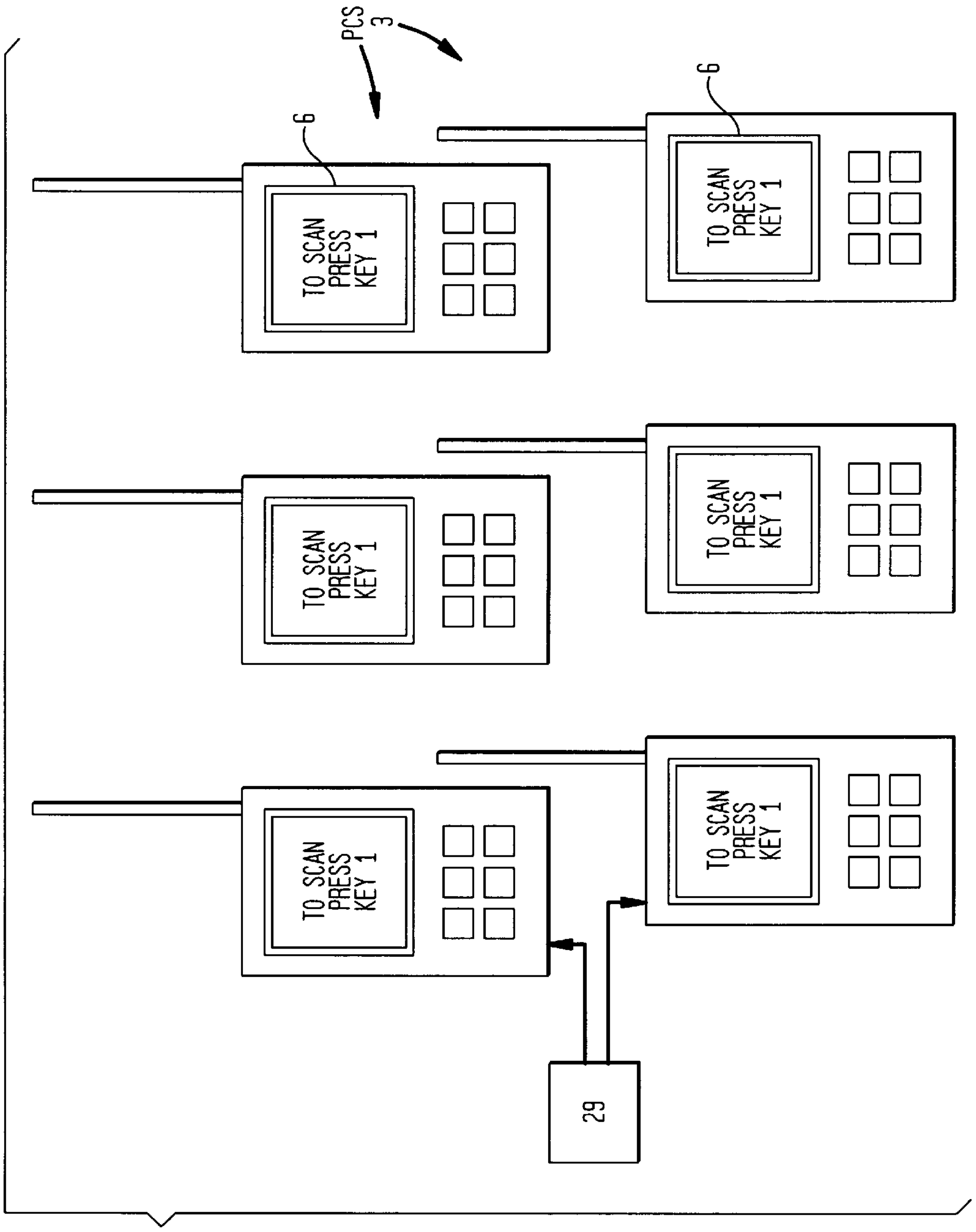
FIG. 1A illustrates a collection of devices, of the type shown in FIG. 1.

Independent of which design approach is taken to implement the logic steps outlined herein, a retail establishment maintains a collection of the PCSs, shown in FIG. 1A, displayed on a rack (not shown). These PCSs, while stored in the rack, receive operating power from a power supply 29, so that they can display messages, as shown in displays 6, without depleting their own batteries. The message may be flashing, or otherwise animated, and explains how to begin using the PCSs.

The message of the stored PCSs serves a function in addition to providing operating instructions. The presence of the message indicates that the PCS is presently operational, and implicitly invites the customer, or an employee in charge of the rack 28, to select a PCS displaying a message, as opposed to one which does not.

Scanning of Product's UPC

Figure 2:
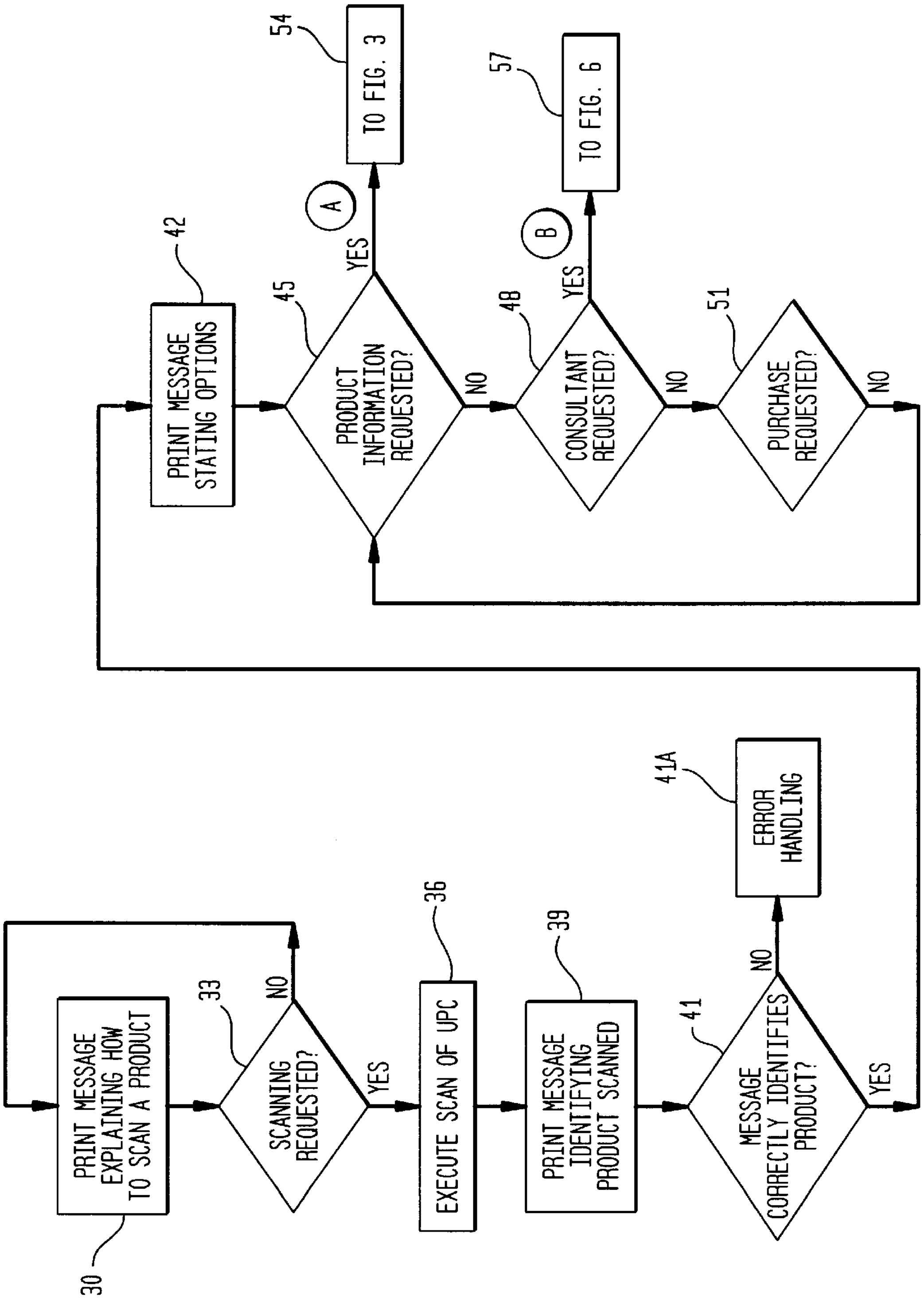
FIGS. 2, 3, 5, 6, and 7 are flow charts, illustrating logic implemented by the invention.

Block 30 in FIG. 2 represents this display of the message, and refers to a "scan" of a product. "Scanning" refers to scanning the product's Universal Product Code, or UPC, which is a bar-code affixed to the product. When the customer follows the instructions of the message, and requests scanning, then scanning is executed, as indicated by blocks 33 and 36.

The scanning acquires the information contained in the UPC of the product. The PCS, using this information, looks up the identity of the product in an inventory table, and prints a message, in common English, on the display 6 of FIG. 1. The message describes the product, in order to assure that customer scanned the product desired. For example, the message may read, "You have just scanned a model KJ300 color television, manufactured by World Conglomerates, Ltd." The message continues, by asking confirmation that the product identification is correct, as indicated by block 41 in FIG. 2.

If the identification is incorrect, then error-handling, indicated by block 41A is undertaken. If the identification is correct, the logic proceeds to block 42, which indicates that the PCS prints a message on display 6 in FIG. 1 which indicates to the customer the options presently available. The options are: obtaining product information, as in block 45 in FIG. 2; obtaining access to a consultant, as in block 48; and purchasing the product just scanned, as in block 51.

Customer Opts for Product Information

Assume that the customer elects the option to obtain product information, as in block 45 of FIG. 2. The adjacent block 54 indicates that the logic proceeds to FIG. 3. In that Figure, block 63 indicates that the PCS prints a message on display 6 in FIG. 1, asking whether the customer wishes to take the information away, or see the information immediately.

If the customer elects to see the information immediately, decision block 66 leads the logic to block 69, which indicates that the information is displayed on display 6 in FIG. 1.

This information may take the form of text, graphics, video, multi-media, any combination of these, or any other suitable type, and may include audible sound. The information may be stored within the PCS, in local mass storage, as in a CD ROM or fixed disc drive, labeled 70 in FIG. 1. If mass storage proves to be impractical, perhaps because the amount of information required is too large, then the PCS can retrieve the information from remote storage, as by using a wireless link.

As a simplified example of this retrieval, the PCS can be equipped with a cellular modem 72 in FIG. 1. Using the cellular modem 72, the PCS can link with the retail establishment's computer system (not shown), through a commercially available cellular telephone provider. The PCS then downloads the necessary information.

Figure 1B:
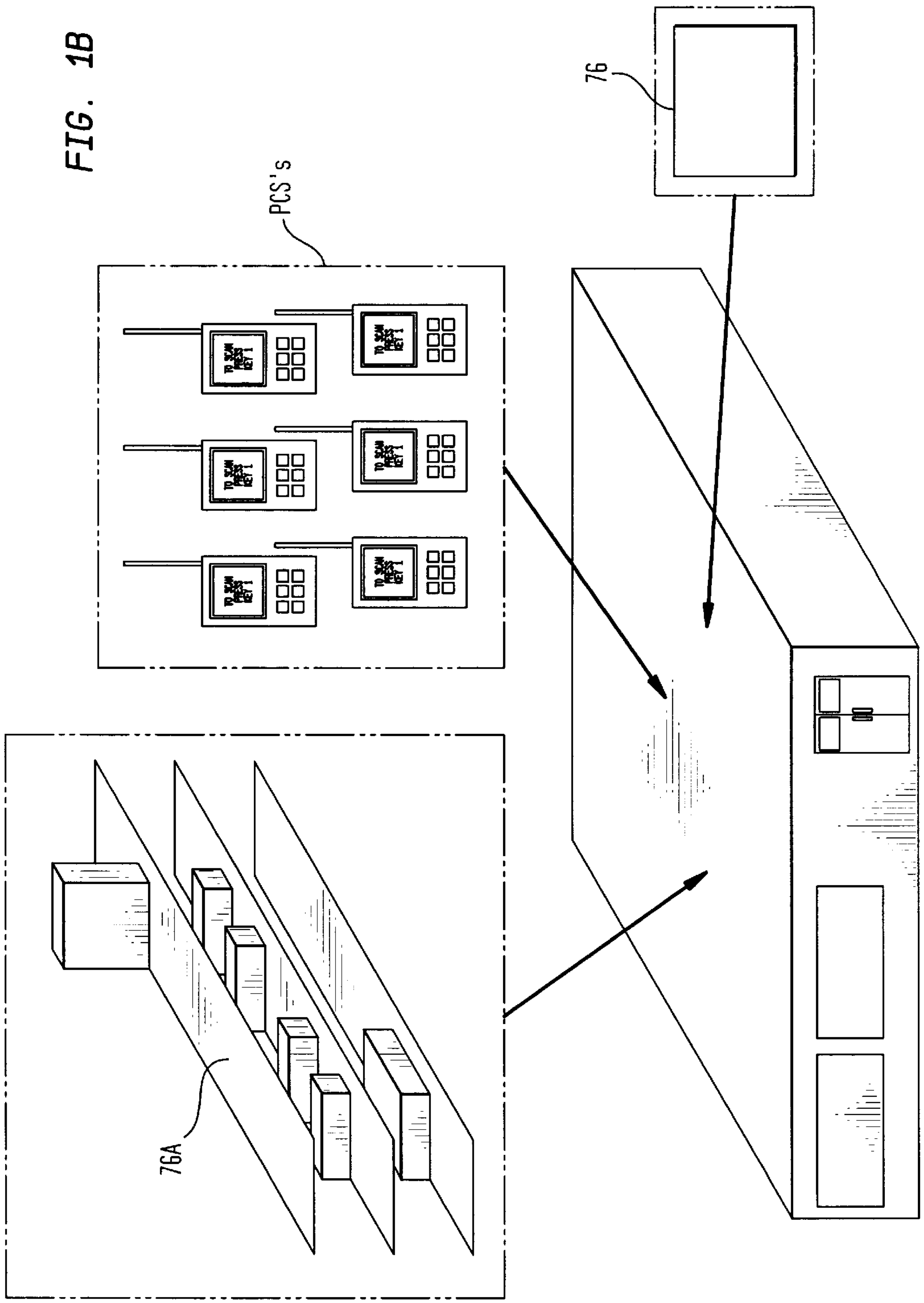
FIG. 1B illustrates a building equipped with devices of the type shown in FIG. 1A, a wireless network, and merchandise on display.

As another example, the retail establishment can be equipped with a radio frequency (rf) network, analogous to an ordinary computer network, but in which rf channels replace hard-wired connections, or another type of wireless communication link, which may utilize higher frequencies than rf, such as microwave or optical frequencies. The PCS obtains the information to be displayed through the rf network, using communication device 73 in FIG. 1. Rf networks are commercially available, such as those sold under the name "WIZARD II" or "FORUM," and available from Lucent Technologies Inc., located in Middletown, N.J., and Denver, Colo. FIG. 1B illustrates a building equipped with a wireless network 76, a collection of PCS's of the type shown in FIG. 1A, and merchandise on display racks 76A.

It is possible that the display 6 of FIG. 1 is not suitable for presentation of some types of information, such as highly detailed graphics or full-motion video. To accommodate this possibility, the retail establishment provides stationary micro-computers, such computer 81 in FIG. 4, to which the customer can dock the PCS, using a commercially available docking station 75. After docking, the PCS can issue appropriate commands to the micro-computer 81, causing it to display the information in question, on its display 81A. Block 71 in FIG. 3 represents these steps.

Figure 3:
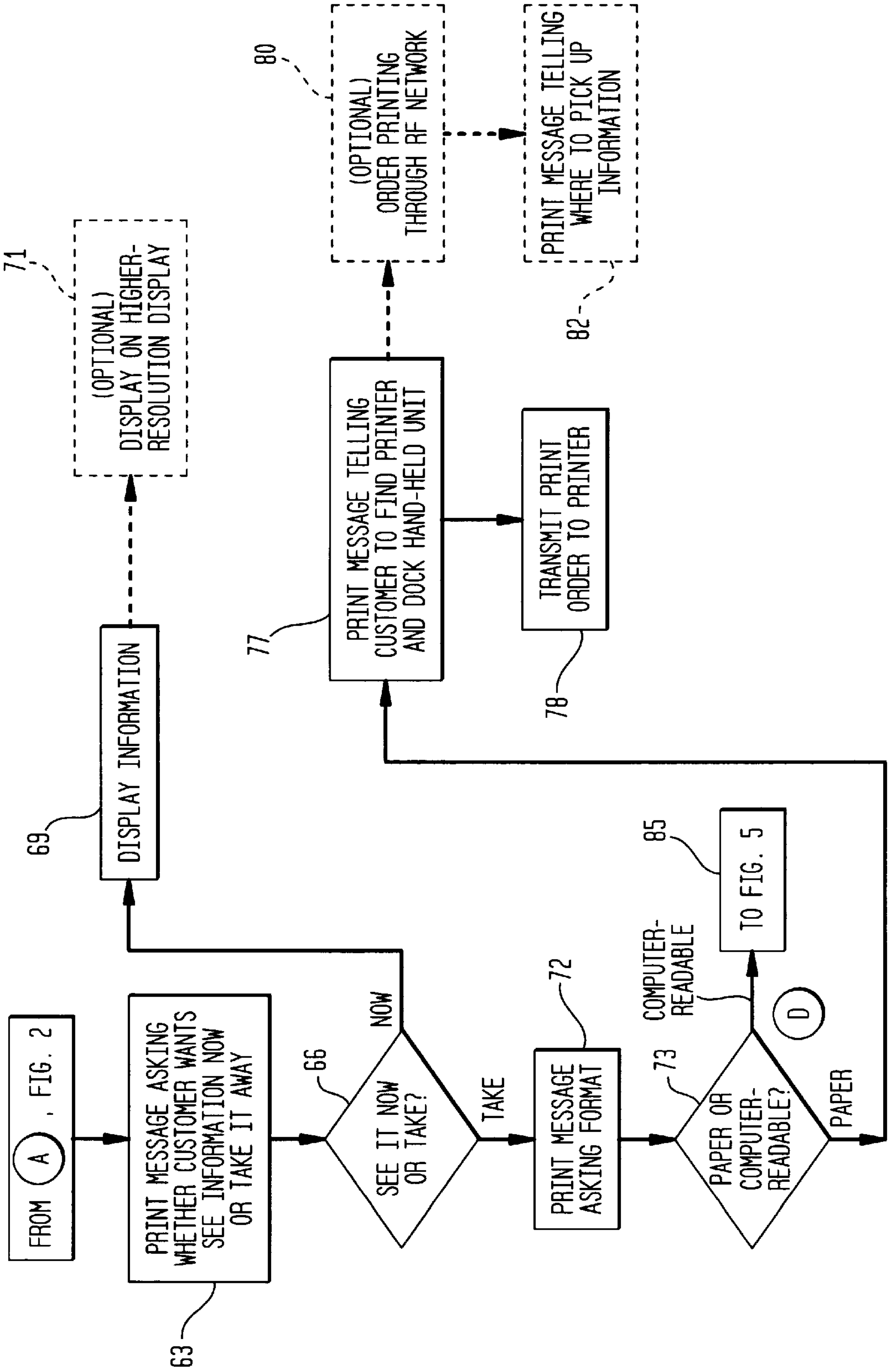

Returning to block 66 in FIG. 3, if the customer chooses to take the information away, then blocks 72 and 73 are reached. The customer is asked to indicate the format, such as computer media or paper, on which the information should be given to the customer.

Figure 4:
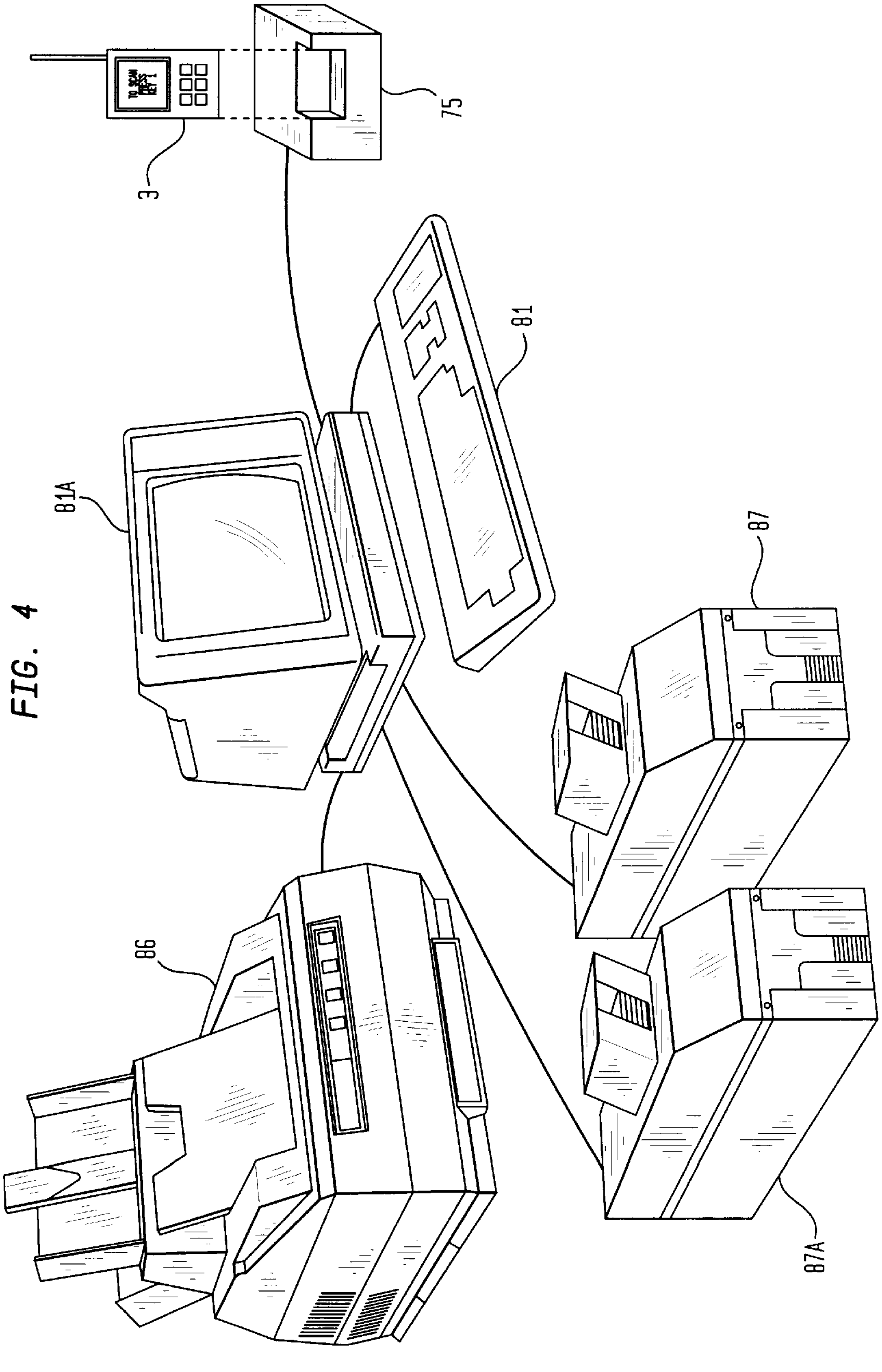
FIG. 4 illustrates a station to which the device 3, shown in FIG. 1, docks, in order to obtain printing services, duplicating services, or a high-resolution display.

If the customer chooses the format of paper, block 77 is reached, which tells the customer to find a printer, such as printer 86 in FIG. 4, and dock the PCS 3 at the printer's station. After docking, the PCS 3 transmits the printing order to the printer, which produces the desired information.

As an option, the PCS 3 can deliver the printing order to the printer through the rf network, as indicated by block 80 in FIG. 3. After doing so, the PCS 3 then displays a message 82 indicating where the customer can pick up the information.

Figure 5:
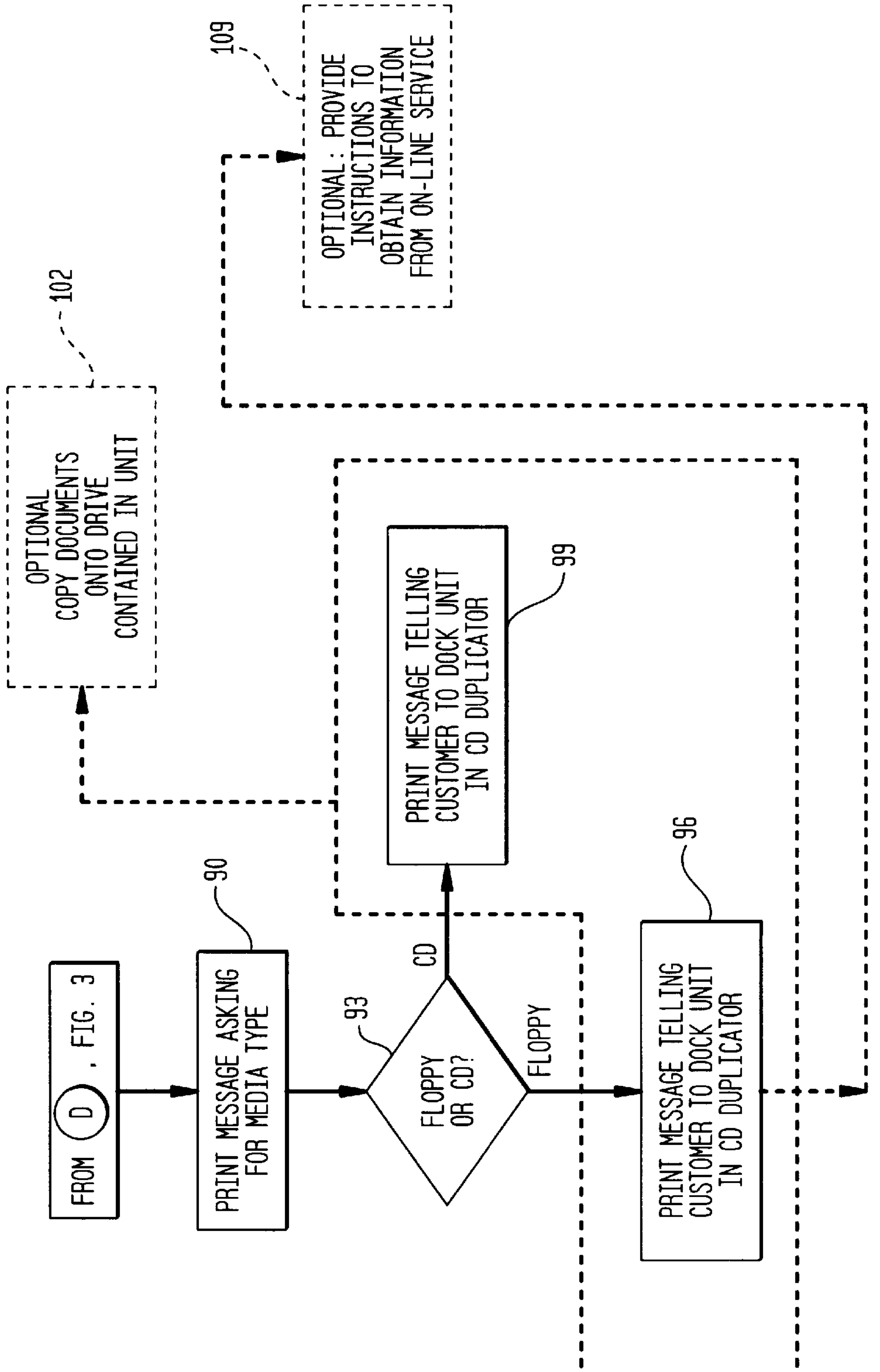

If the customer chose computer-readable media in decision block 73, adjacent block 85 indicates that the logic proceeds to FIG. 5. Block 90 indicates that the PCS displays a message telling the customer to select a type of media, such as floppy disc or CD ROM, as indicated. The customer makes a selection in block 93.

If the customer chose a floppy diskette, block 96 is reached, wherein the PCS displays a message telling the customer to dock the PCS in a floppy diskette duplicator, such as duplicator 87 in FIG. 4. If the customer chose a CD ROM, block 99 is reached, wherein the PCS displays a message telling the customer to dock the PCS in a CD ROM duplicator 87A, again shown in FIG. 4. In either case, the PCS provides the appropriate instructions to the duplicator in which the PCS has been docked. Then, the duplicator furnishes the information, on the medium desired, which is preferably a computer-readable data cassette.

As an alternate approach, the PCS can be equipped with its own duplicating equipment, such as a floppy disc drive, generally indicated by block 98 in FIG. 1. In this case, block 102 in FIG. 5 is reached, which indicates that the PCS itself provides a copy of the information, on the media desired.

As yet another alternate approach, the retail establishment may make the information publicly available, as through an on-line service, or through the INTERNET. Customers may contact the address, using a micro-computer, and download the information. However, the actual procedures for downloading the information may be complex: the customer is required to dial a telephone number, log in to a system, and then fetch a particular file of product information, among thousands of such files.

To simplify the procedures, the PCS can contain a small printer, such as those used in cash registers, indicated by block 107 in FIG. 1. The PCS can print out the necessary information, such as telephone number, log-in procedure, file name and location, and instructions for downloading the file. This procedure is indicated by block 109 in FIG. 5. Or the printing procedures described above can be undertaken.

Alternately, the PCS can deliver a floppy diskette to the customer, which contains material sufficient to retrieve the information. The customer, at a later time, loads the floppy diskette into a computer. Programming contained on the floppy diskette automatically contacts a remote storage system, as through a telephone link, and retrieves information about the product.

Figure 7:
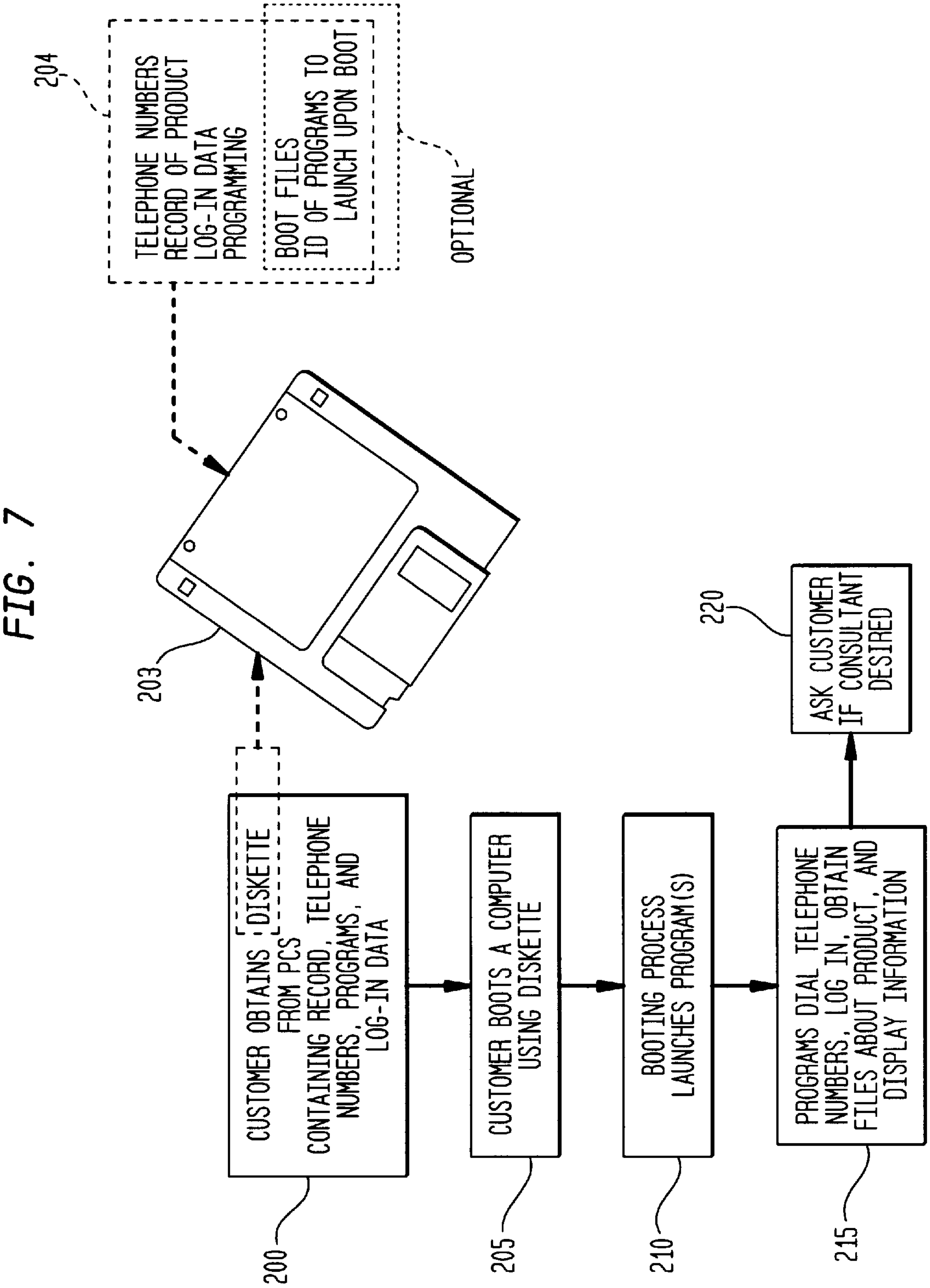

FIG. 7 is a flow chart illustrating logic undertaken by this form of the invention, and also steps executed by a customer. Block 200 indicates that the PCS delivers a diskette to the customer. As indicated by block 200, and block 204, associated with diskette 203, the diskette contains (1) a record which identifies the product scanned, (2) data needed to contact the remote storage system, such as telephone numbers, log-in codes, and passwords, and (3) computer programs.

The customer departs the mercantile establishment with the floppy diskette. To use the diskette, the programming contained in it must be launched. Preferably, this launching process involves a minimal amount of participation by the customer.

As one example of a simplified launching procedure, assume that the computer runs the operating system "DOS," available from Microsoft Corporation, located in Redmond, Wash. Assume also that the floppy diskette is of the "bootable" type, and contains a file (e.g., "AUTOEXEC.BAT") which tells "DOS" which programs to launch upon booting, as indicated by the "OPTIONAL" symbol in block 204.

In this example, the customer places the floppy diskette into a disc drive, and then powers up the computer. The operating system, DOS, recognizes the bootable diskette, boots up the system as indicated in block 205, reads the file, and launches the programs identified therein, as indicated in block 210.

These programs, using passwords and telephone numbers contained on the floppy diskette, dial up the remote storage facility and log in, as indicated by block 215. Then, using the record of the product identified, which is contained on the floppy diskette, the programs interrogate the storage facility, and retrieve files containing information which describes the product. The programs display this information on the display of the computer.

Preferably, these processes are undertaken with little, or no, involvement of the customer. That is, the processes just described required that the customer know nothing about the storage facility, such as its telephone number, the passwords required to log into it, nor the identity of the product in question. All of that information was supplied by the PCS, on the floppy diskette.

It is possible that the customer may be required to supply some information, such as operating characteristics of the customer's modem. However, this information concerns the customer's own computer system, and not the remote data storage facility. Thus, it is preferred that, if any information is required to be supplied by the customer, that information is only sufficient to allow the programming of the floppy diskette to reach a free telephone line. Once the programming reaches the free telephone line, the customer's involvement is terminated, with the possible exception of administrative matters, such as asking the customer how much information is desired. In addition, as indicated by block 220, the programming may ask whether the customer wishes to speak with a consultant (as described below), as long as a telephone connection has been established with the storage facility. If so, the programming summons a consultant, and establishes a voice link, as known in the art.

Customer Opts for Consultant

Block 48 in FIG. 2 provides the option of contacting a consultant. The adjacent block 57 indicates that the logic continues in FIG. 6. In that Figure, block 120 indicates that the PCS identifies a consultant. For identifying a consultant, the system maintains a table, in which one, or more, consultants is assigned to each Universal Product Code. The PCS looks up the consultant assigned to the UPC which was scanned by the customer, and attempts to contact the consultant, as by using the rf network described above, or by making a cellular telephone call, using the cellular capabilities of the PCS. Block 121 in FIG. 1 represents cellular telephone equipment.

Figure 6:
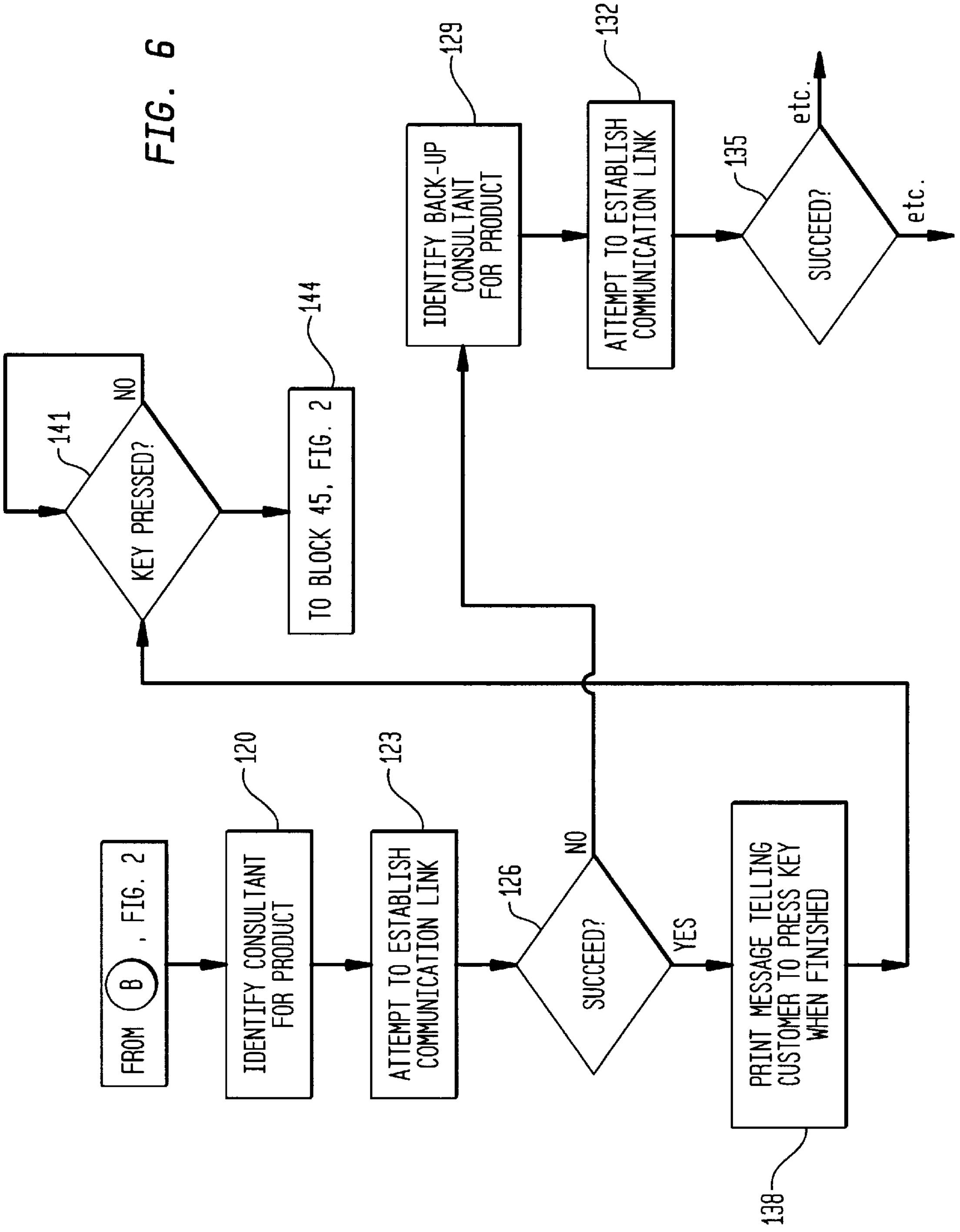

If a consultant is reached, as indicated by blocks 126 and 138 in FIG. 6, the PCS then prints a message, telling the customer to press an appropriate key 9 in FIG. 1 when the consultation terminates. When the key-press occurs, the logic returns to an appropriate point, such as block 45 in FIG. 2, as indicated by blocks 141 and 144 in FIG. 6.

If the attempt to reach a consultant fails, the logic proceeds to block 129 in FIG. 6, wherein a back-up consultant is identified, as indicated by block 129, and an attempt is made to contact that consultant, as indicated by blocks 132 and 135. The process continues, until terminated by the customer, or a consultant is reached, as indicated by the symbols "etc." associated with block 135.

Customer Opts to Purchase Product

Block 51 in FIG. 2 indicates that the customer can request purchase of the product through the PCS. If the customer elects the purchase, the PCS establishes a link with a sales representative, analogous to establishing a link with a consultant, as in the logic following block 48 of FIG. 2. The sales representative handles the details of the transaction.

Alternate Modes of Scanning

The preceding discussion presumed that bar-code labels are associated with the products. However, other types of labels can be used, such as an alpha-numeric label, which is read by an optical character scanner.

Another type of labeling apparatus which can be used is manufactured by B-I Corporation, 6400 Lookout Road, Boulder, Colo. This device is a non-powered integrated circuit (IC), which is attached to a product. When the IC is interrogated by incoming rf energy, provided by a transmitter which is also available from B-I Corporation, the IC derives operating power from the rf energy, and transmits a pre-programmed code to the transmitter. In the present invention, this code would identify the product to which the IC is attached.

Comparison With Prior Art

Portable devices exist, which are used in inventory control systems, and which scan bar-codes of products stored on shelves, as in supermarkets. When such a device scans a product, the device displays a phrase identifying the product just scanned.

One form of the invention differs from such devices, at least in the respect that the invention provides a restricted set of functions, compared with those of such devices. For example, one form of the invention only (1) scans a product, to determine the product's identity, and then (2) retrieves descriptive information about the product from storage, which is either local, or remote. This form of the invention performs no other significant functions, such as inventory-control functions.

From another point of view, the invention is operated by customers. A retail establishment would not, as a rule, provide customers with inventory-control scanners, even if those scanners provided descriptive information about the products, which is of interest to the customers. One reason is that such scanners communicate with the establishment's overall computer system. The potential for pranksters and hackers to cause damage to the computer system is sufficiently great that customers would be prohibited from using the scanners.

Numerous substitutions and modifications can be undertaken without departing from the true spirit and scope of the invention. What is desired to be secured by Letters Patent is the invention as defined in the following claims.

I claim:

1. A portable device, consisting essentially of:

a) identification means for identifying a product located near the device; and b) information means for:

i) retrieving information from storage which describes characteristics of the product identified; and ii) displaying the information.

2. Device according to claim 1, wherein the information is retrieved from storage located remote from the device.

3. Device according to claim 1, wherein the device is hand-held.

4. Device according to claim 3, wherein the information includes pictorial information.

5. Device according to claim 1, and further comprising means for:

c) delivering a computer-readable medium to a customer, said medium containing information, programs, or both, which enable a user to download descriptive information about the product identified from a network.

6. Device according to claim 5, wherein the network comprises INTERNET.

7. A portable hand-held device, consisting essentially of:

a) a non-contact identification system, for identifying a product located near the device;

b) a system for:

i) retrieving identity information from storage which identifies the product;

ii) displaying the identity information;

iii) displaying a signal inquiring whether the information correctly identifies the product; and iv) receiving a signal affirming correctness of identification and, in response, displaying further descriptive information about the product.

8. Device according to claim 7, wherein the storage is located remote from the device.

9. Device according to claim 8, wherein the device contacts the storage through a wireless network.

10. Device according to claim 7, wherein the further descriptive information includes pictorial information.

11. A method of supplying information about products to prospective purchasers, consisting essentially of the following steps:

a) maintaining a collection of portable devices, each of which consists of:

i) an identification system for identifying a product brought into proximity of the device;

ii) a retrieval-display system for:

A) retrieving identity information about the product identified;

B) displaying the identity information;

C) displaying a message inquiring whether the identity information correctly identifies the product; and D) receiving affirmation that the product is correctly identified and, in response, displaying further descriptive information about the product; and b) delivering said portable devices to customers.

12. A system, consisting essentially of:

a) a building containing items of merchandise, with a label associated with each item;

b) a wireless network linked to a data storage facility;

c) a plurality of portable devices, each effective to:

i) identify an item, based on the label associated with the item;

ii) inquire whether the item has been identified correctly and, if so, retrieve further information about the item from the data storage facility, through the wireless network, and display the information.

13. Method according to claim 12, wherein the further descriptive information includes pictorial information.

14. A system, consisting essentially of:

a) a collection of portable devices, each of which consists of:

i) an identification system for identifying a product brought into proximity of the device;

ii) a retrieval system for retrieving information about the product identified; and iii) a display system for displaying the information retrieved;

b) one or more stations, each comprising at least one component from the following group:

i) a graphics display;

ii) a printer;

iii) a drive for copying information onto computer storage media;

and each station also consisting essentially of:

iv) an interface, effective to:

A) communicate with one of said portable devices; and

B) cause components present at the station to deliver descriptive information about said products, in response to a request from the portable device.

15. A device for providing assistance to a customer of a mercantile establishment, consisting essentially of:

a) identification means for identifying a product located in proximity to the device; and b) delivery means for delivering information to the customer which is effective to enable a computer to retrieve information about the product from a storage facility located remote from the computer.

16. Device according to claim 15, wherein the identification means comprises a bar-code scanner.

17. Device according to claim 15, wherein the information delivered is carried by a computer-readable data cassette.

18. Device according to claim 17, wherein the information includes a record which specifies the product identified.

19. A portable device, consisting essentially of:

a) a non-contact identification system, for identifying a product located near the device;

b) a memory system for retrieving information from storage which describes characteristics of the product identified;

c) a display system, for displaying the information retrieved; and d) a wireless voice-communication system.

* * * * *